US 7,299,008 B2

(12) United States Patent
Gluck (10) Patent No.: US 7,299,008 B2
(45) Date of Patent: Nov. 20, 2007

(54) CALL MANAGEMENT SYSTEM AND METHOD FOR SERVICING MULTIPLE WIRELESS COMMUNICATION DEVICES

(75) Inventor: Amir Gluck, Tel Aviv (IL)

(73) Assignee: IXI Mobile, Ltd. (IL)

( * ) Notice: Subject to any disclaimer, the term of this patent is extended or adjusted under 35 U.S.C. 154(b) by 330 days.

(21) Appl. No.: 10/681,758

(22) Filed: Oct. 8, 2003

(65) Prior Publication Data

US 2005/0078608 A1 Apr. 14, 2005

(51) Int. Cl.
*H04B 7/00* (2006.01)
(52) U.S. Cl. .................. 455/41.2; 455/463; 455/88; 370/254
(58) Field of Classification Search ............... 455/41.2, 455/41.1, 411, 88, 463; 370/254
See application file for complete search history.

(56) References Cited

U.S. PATENT DOCUMENTS

| 6,795,688 | B1 * | 9/2004 | Plasson et al. ............. 455/41.2 |
| 6,907,227 | B2 * | 6/2005 | Fujioka ..................... 455/41.3 |
| 2003/0054821 | A1 * | 3/2003 | Kita et al. .................. 455/435 |
| 2003/0177210 | A1 * | 9/2003 | Stringham .................. 709/222 |

\* cited by examiner

*Primary Examiner*—Sanh D. Phu
(74) *Attorney, Agent, or Firm*—Century IP Law Group, Inc.; F. Jason Far-Hadian, Esq.

(57) ABSTRACT

A method for establishing a wireless communication interface between a call management device and a plurality of mobile communication devices is provided. The method comprises implementing an association between the call management device and each of the plurality of mobile communication devices; configuring the call management device as a primary device in a personal area network (PAN); and configuring each of the plurality of the mobile communication devices as a non-primary device in the PAN.

8 Claims, 4 Drawing Sheets

CALL MANAGEMENT SYSTEM AND METHOD FOR SERVICING MULTIPLE WIRELESS COMMUNICATION DEVICES

BACKGROUND

1. Field of Invention

The present invention relates generally to wireless communication services and, more particularly, to a system and method for servicing multiple wireless communication devices in a personal area network.

2. Copyright & Trademark Notices

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

3. Related Art

Wireless communication technology and wireless communication devices continue to grow in popularity as the related systems and accessories become more affordable and easier to use. A recent trend in wireless communication involves implementation of personal area networks (PAN) for connecting ordinary household items to each other, using efficient and cost-effective wireless technologies such as Bluetooth™ or Wi-Fi™.

For example, some recently developed wireless mobile communication devices (e.g., Sony Ericsson P800, 3G Motorola A830, Siemens S55, Nokia 6310i) include a Bluetooth interface that enables the device to wirelessly communicate with another system, such as a hands free car kit. For the communication to be successful, the hands free car kit will need to include a wireless communication port compatible with the Bluetooth technology used in the mobile phone. Further, the car kit and the mobile phone need to go through a one-time initial pairing process to establish the appropriate communication settings.

Thereafter, the mobile phone and the car kit can wirelessly communicate as soon as the two devices are located within a proximate communication range. Thus, a user can seamlessly use the hands free and other features of the car kit without having to plug the mobile phone into a particular wire or cradle. Even more conveniently, the user need not even remove his or her mobile phone from his briefcase, purse or trunk of the car, so long as the mobile phone and the car kit remain within a reasonable communication distance.

Several disadvantages, however, are associated with the current systems. For example, the currently implemented car kit can communicate only with the mobile phone with which it is paired. That is, if a second mobile phone is within the communication range of the car kit, the car kit will not be able to service the second phone. To overcome this problem, a user must pair the second mobile phone with the car kit. This task is inconvenient, however. Besides, by pairing the second phone, the communication interface between the first phone and the car kit will become unavailable.

It would be very useful if the current car kit systems could be improved to service more than one mobile phone at all times.

SUMMARY

The present disclosure is directed to a system and corresponding methods for enabling a call management device to service more than one wireless mobile communication device in a wireless personal communications network (PAN). To accomplish this, in accordance with one or more embodiments, the call management device is designated as the primary (i.e., master) device in the network, and the mobile communication devices are designated as the corresponding non-primary (i.e., slave) devices. Alternatively, a plurality of separate networks may be implemented, wherein each of the respective mobile communication devices are designated as the primary device in each network, and the call management device is designated as the non-primary device in each network.

For purposes of summarizing, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested.

In accordance with one aspect of the invention, a method for establishing a wireless communication interface between a call management device and a plurality of mobile communication devices is provided. The method comprises implementing an association between the call management device and each of the plurality of mobile communication devices; configuring the call management device as a primary device in a personal area network (PAN); and configuring each of the plurality of the mobile communication devices as a non-primary device in the PAN.

The implementing process comprises creating a list of the associations between the call management device and each of the plurality of mobile communication devices. The list is stored in a memory of the call management device. In one embodiment, the PAN is a piconet for connecting the call management device to each of the plurality of mobile communication devices using Bluetooth communication technology. The call management device can be a hands-free car kit.

In certain embodiments, a method for establishing a wireless communication interface between a call management device and a plurality of mobile communication devices, comprises implementing an association between the call management device and each of the plurality of mobile communication devices; configuring each of the plurality of the mobile communication devices, respectively, as a primary device in a corresponding personal area network (PAN); and configuring the call management device as a non-primary device in each of the corresponding PANs.

The implementing process comprises creating a list of the associations between the call management device and each of the plurality of mobile communication devices, wherein the list is stored in a memory of the call management device. Each of the corresponding PANs is a piconet for connecting the call management device to a respective one of the plurality of mobile communication devices in a scatternet, using Bluetooth communication technology.

In accordance with one or more embodiments, a vehicle-mount call management system is connected to N wireless mobile communication devices in a personal area network (PAN), wherein the call management system is configured as a primary device and each of the N wireless mobile communication devices is configured as a non-primary device in the PAN, wherein the call management system services requests submitted by each of the N wireless mobile communication devices.

The call management system is connected to the N wireless mobile communication devices in a piconet using Bluetooth technology, for example. The call management system can comprise a hands-free car kit having a list of associations, each association respectively identifying a corresponding mobile communication device in the PAN.

In accordance with another embodiment, a vehicle-mount call management system is connected to N wireless mobile communication devices in N personal area network (PAN), wherein the call management system is configured as a non-primary device in each of the N PANs, and each of the N wireless mobile communication devices is configured as an a primary device in each of the N PANs, wherein an nth mobile communication device services requests submitted by the call management system in an nth PAN.

The call management system is connected to each of the N wireless mobile communication devices in N unique piconets, using Bluetooth technology. The call management system may comprise a hands-free car kit having a list of associations, each association respectively identifying the N corresponding mobile communication devices in the N PANs.

A wireless mobile communication device, in accordance to one embodiment is configured as a non-primary device in a personal area network (PAN), wherein the personal area network comprises a plurality of N wireless mobile communication devices configured as non-primary devices and a call management system configured as a primary device for servicing requests submitted by the N wireless mobile communication devices. The PAN is a piconet connecting N wireless mobile communication devices to the call management system using Bluetooth technology.

In accordance with yet another embodiment, a first wireless mobile communication device configured as a first primary device in a first personal area network (PAN), wherein the first PAN comprises a call management system configured as a non-primary device for servicing requests submitted by the first wireless mobile communication device and at least a second wireless mobile communication device in a second PAN, wherein the second wireless mobile communication device is respectively configured as a second primary device in the second PAN. In some embodiments, each of the first and the second PANs is a piconet connecting the respective first and second wireless mobile communication devices to the call management system using Bluetooth technology.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION

A computing system and corresponding computer executable methods, according to an embodiment of the present invention, facilitate and provide a call management system for servicing multiple wireless mobile communication devices in a personal area network (PAN). A PAN is, typically, a close range wireless network in which multiple devices can communicate with one another as soon as a device is situated within the proximate range of another device. The devices in the PAN are generally equipped with low-cost, low-power, short-range radio communication interfaces, supported by well-known wireless communication protocols.

Numerous specific details are set forth to provide a thorough description of various embodiments of the invention. Certain embodiments of the invention may be practiced without these specific details or with some variations in detail. In some instances, features not pertinent to the novelty of the system are described in less detail so as not to obscure other aspects of the invention.

Figure 1A:
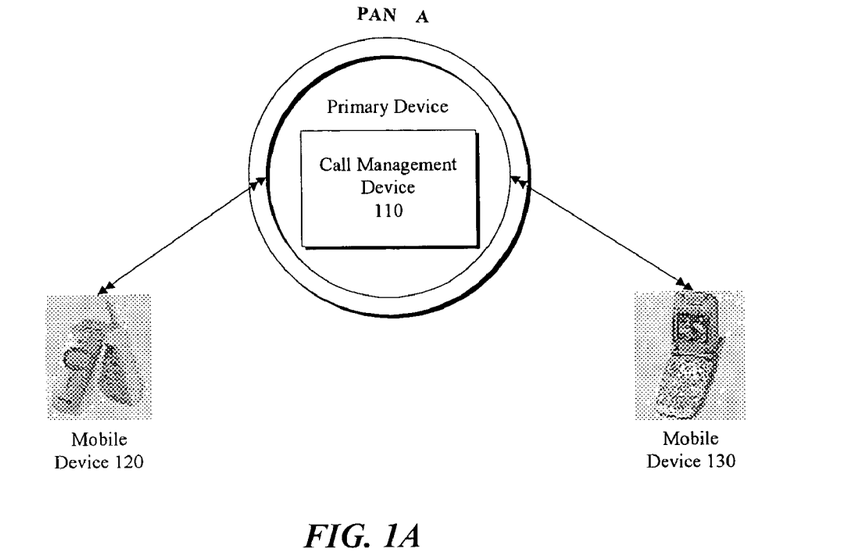
FIG. 1A illustrates an exemplary personal area network communication environment, in accordance with one embodiment of the invention.
Figure 1B:
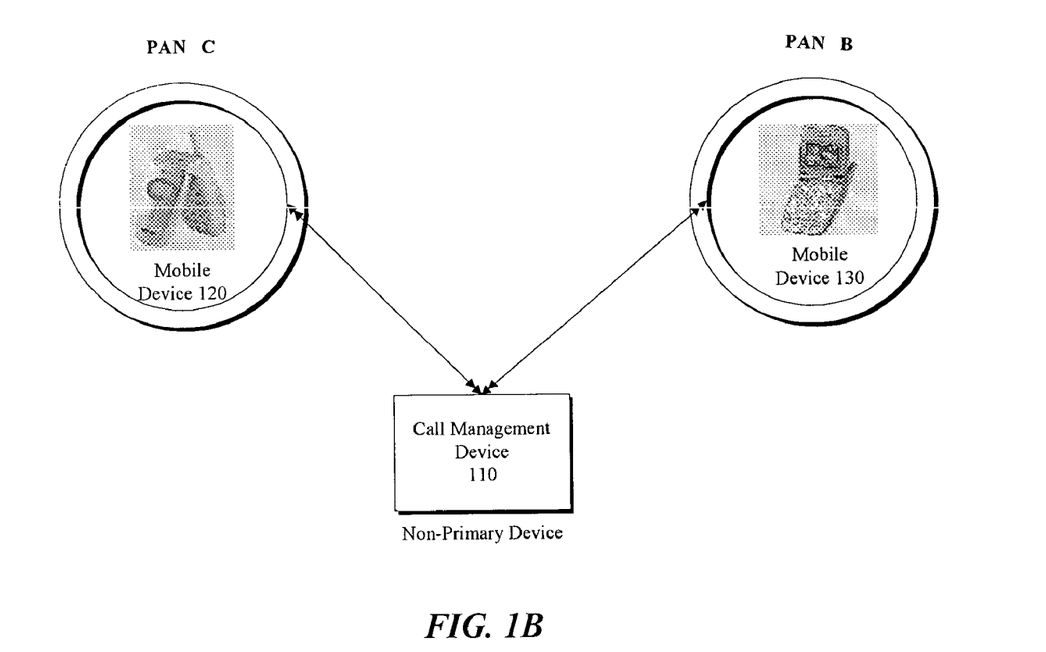
FIG. 1B illustrates an exemplary personal area network communication environment, in accordance with another embodiment of the invention.

Referring to FIG. 1, in one or more embodiments of the present invention, Bluetooth technology is applied as a means of wireless communication between a call management device 110 and a plurality of wireless mobile communication devices 120, 130. This application, however, is by way of example. As such, other wireless communication technologies suited for connecting wireless devices in short-range area networks, such as IEEE 802.11 and the like may be utilized. The terms "connected," "coupled," or any variant thereof, mean any connection or coupling, either direct or indirect, between two or more elements. The coupling or connection between the elements can be physical, logical, or a combination thereof.

One of ordinary skill in the art will appreciate that the communication network of the present invention may advantageously be comprised of one or a combination of various types of networks without detracting from the scope of the invention. Such networks in addition to a PAN can, for example, comprise local area networks (LANs), wide area networks (WANs), public, private or secure networks, value-added networks, interactive television networks, two-way cable networks, satellite networks, interactive kiosk networks, cellular communications networks, personal mobile gateways (PMGs) and/or any other suitable communications network.

In certain embodiments, application software is executed on mobile devices 120, 130 to act as client software that is in communication with server software executed on call management device 110. In such an embodiment, mobile devices 120, 130 are configured as non-primary (slave)

devices and call management device 110 is configured as the primary (master) device, for example.

In an alternative embodiment, the application software executed on call management device 110 acts as client software that is in communication with server software executed on mobile devices 120, 130. In such an embodiment, mobile devices 120, 130 are configured as primary (master) devices and call management device is configured as the non-primary (slave) device.

In one embodiment, mobile devices 120, 130 may comprise a PMG device or communicate with a PMG device in the call management device 110. The PMG architecture comprises a PMG server that can wirelessly communicate with a number of PMG enabled devices within the personal area of the user or a PAN. A more detailed description of the PMG architecture is provided in U.S. patent application Ser. No. 09/850,399, filed on May 7, 2001, the entire content of which is hereby incorporated by reference here.

As used herein, the terms wireless mobile communication device, call management system and communication network are to be viewed as designations of one or more computing environments that comprise application, client or server software for servicing requests submitted by respective software included in devices or other computing systems connected thereto. These terms are not to be otherwise limiting in any manner. The application software, for example, may be comprised of one or more modules that execute on one or more computing systems, as provided in further detail below.

Referring to FIG. 1A, in accordance with one embodiment of the present invention, call management system 110 (i.e., a vehicle mountable hands free car kit) and mobile devices 120, 130 (i.e., handheld wireless cellular phones) are connected in a PAN A (i.e., a piconet), when either mobile device 120 or 130 enters a specific range in the proximity of call management device 110.

Figure 2:
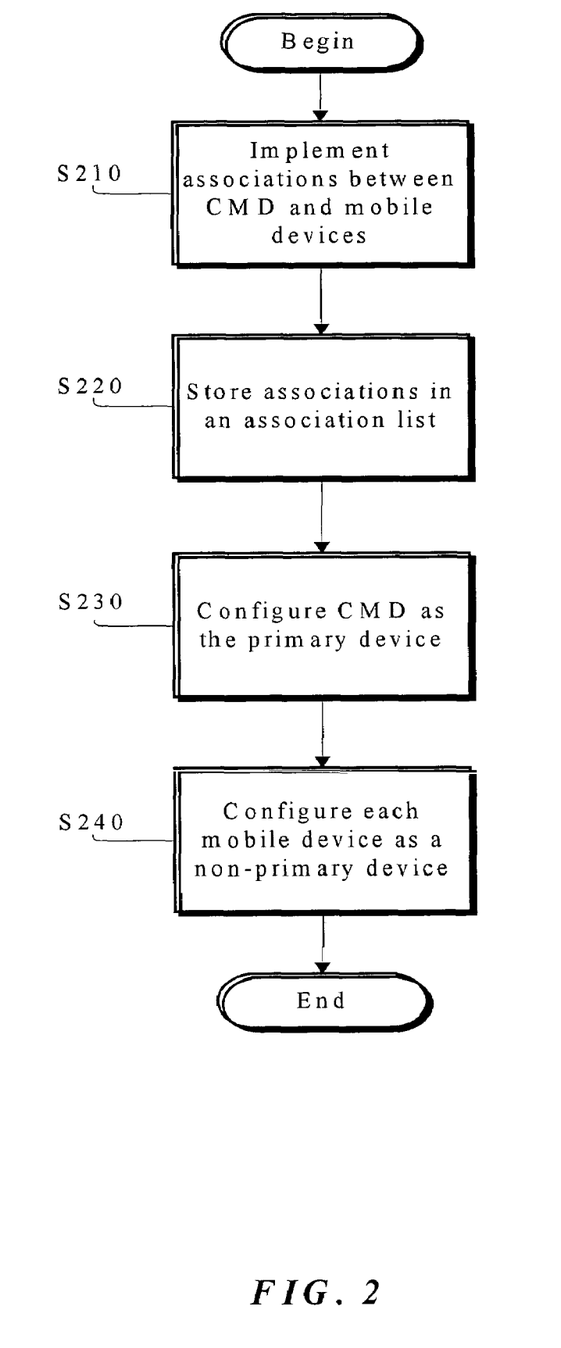
FIG. 2 is a flow diagram of a call control method for servicing multiple wireless mobile communication devices, in accordance with one or more embodiments.

Referring to FIG. 2, for a connection to be properly established, an association is implemented between each mobile device 120, 130 and call management device 110 (S210). Implementing an association comprises a pairing process after which mobile devices 120, 130 and call management device 110 can securely communicate with each other. When two devices are paired, the devices are synchronized on one or more respective frequency sequences to receive signals from other paired devices at predetermined clocked time periods.

The association process provides for a secure communication environment, where devices can communicate with each other without interfering with other communications in nearby frequency ranges. For additional privacy and security, encryption can be applied to the data carried in the signals communicated between the devices. Thus, in certain embodiments, when the associations are implemented, encryption/decryption keys are also exchanged between the corresponding devices.

Each of the implemented associations is stored as an entry in an association list (S220). The association list may be stored in a storage unit (i.e., memory) of call management device 110, or alternatively in one or more storage units in mobile devices 120 or 130. Based on the entries in the association list, call management device 110 can identify a mobile device entering the range of PAN A.

In some embodiments, call management device 110 is configured as the primary device in the PAN (S230). As the primary device, call management device 110 dictates the frequency range on which other devices in PAN A can communicate. Depending on the type of the communication technology utilized, call management device 110 may also dictate the time frame of communication for each device in PAN A. As disclosed in further detail below, in some embodiments of the invention, call management device 110 also dictates a frequency hopping sequence which is followed by the other devices in PAN A, to minimize interference.

In one embodiment, Mobile devices 120, 130 are configured as non-primary devices in PAN A (S240). A non-primary device follows the frequency range and communication time frame dictated by the primary device in the network. Accordingly, once call management device 110 and mobile devices 120, 130 are configured, PAN A is established allowing the devices to communicate.

As long as at least one of mobile devices 120 or 130 is within the communication range of call management device 110, the two devices can communicate. If both mobile devices 120 and 130 are within the communication range of call management device 110, then call management device 110 recognizes both mobile devices 120 and 130 and services their requests.

In certain embodiments, when mobile device 120 enters the respective service range, call management device 110 attempts to identify mobile device 120 before establishing a line of communication with it. To verify that mobile device 120 is an authorized device, call management device 110 receives a unique identifier communicated by mobile device 120. If call management device 110 can find a match between the unique identifier and one of the entries in the association list, then mobile device 120 is recognized as an authorized device. Otherwise, call management device 110 would not service any requests submitted by mobile device 120.

Once mobile device 120 is recognized as an authorized device, then call management device 110 services mobile device 120's requests. In the event that another associated mobile device 130 enters the service range of call management device 110, the same recognition process is repeated. Since call management device 110 is the primary device, it dictates the communication frequency, time frame and frequency hopping spectrum for each of mobile devices 120 and 130, for example. As such, each mobile device 120, 130 in PAN A can communicate with call management device 110 without interference.

In one embodiment of the invention, call management device 110 is a vehicle-mountable hands free kit and mobile device 120 is a handheld cellular phone equipped with a wireless interface. As such, when a user enters the communication range with his or her cell phone, the cell phone synchronizes with the hands free kit. The user can then use the hands free kit to make calls, receive calls, and carry on a conversation without having to pickup the cell phone, so long as the cell phone is associated with the hands free kit.

In one or more embodiments, if a second hand held cellular phone enters the range of service, the hands free kit first attempts to determine if an association for the second hand held cellular phone exists in the association list. If so, then the second hand held cellular phone also synchronizes with the hands free kit and becomes part of PAN A, in which the hands free kit is configured to be the primary device and the first and second hand held phones are configured as non-primary devices (see FIGS. 1A, 2).

When a voice call is received or initiated by the first cellular phone, the hands free kit does not service any voice calls for the second cellular phone. Alternatively, in some embodiments, the hands free kit prioritizes the calls according to a predetermined ordering mechanism (i.e., first-in/ first-out queue). In this manner, once the hands free kit has completed servicing the voice session for the first cellular phone, it then services the voice session for the second cellular phone.

Thus, in certain embodiments, once voice session is serviced at each instance. It is noteworthy, however, that while servicing a voice call for one phone, the hands free kit can, for example, let the user browse the phone book of the other phone, or access other features that are unrelated to the voice session. Certain embodiments of the invention can be configured to handle more than one voice session at a time. The user will have the option of switching between voice sessions by interacting with a user interface mechanism to, for example, put one voice session on hold to access another.

Figure 3:
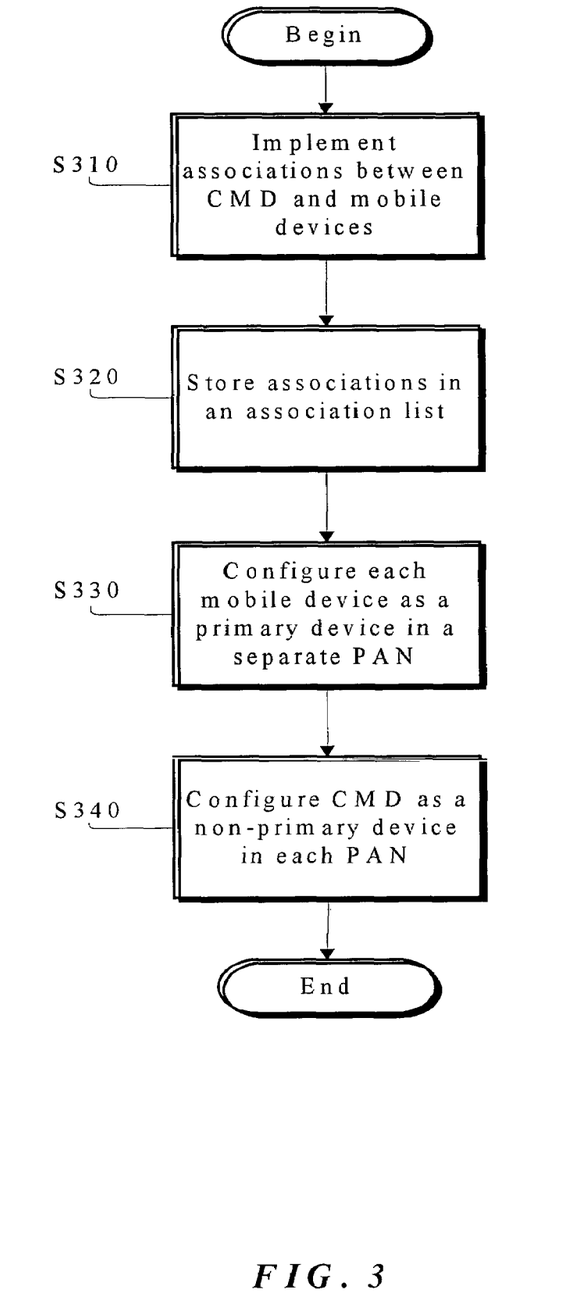
FIG. 3 is a flow diagram of a call control method for servicing multiple wireless mobile communication devices, in accordance with another embodiment.

Referring to FIGS. 1B and 3, according to another embodiment of the invention, after an association list is implemented (S310, S320), each mobile device 120, 130 is configured as a primary device (S330) and call management device is configured as a non-primary device (S340). According to this embodiment, two separate wireless communication networks PAN B and PAN C are implemented. PAN B comprises mobile device 130 as the primary device and call management device 110 as the non-primary device. PAN C comprises mobile device 120 as the primary device and call management device 110 as the non-primary device.

In some embodiments, call management device 110 synchronizes with each of the mobile devices 120, 130, once each device is within the respective service range. Since in each network (i.e., PAN B and PAN C) mobile devices 120 and 130 are the respective primary devices, call management device 110 as the non-primary device in each network synchronizes with the frequency dictated by the respective mobile device 120 or 130. Communication interference is avoided by setting unique communication frequency, communication time frame, or frequency hopping spectrums, for example.

As such, a single call management device 110 can be used to service requests submitted by a plurality of mobile devices 120, 130 configured as the primary device in a plurality of short-range wireless networks. In a certain preferred embodiment, the short-range wireless networks are implemented using Bluetooth technology.

Bluetooth offers fast and reliable digital transmissions of both voice and data over the globally available, unlicensed, 2.4 GHz Industrial, Scientific and Medical (ISM) band. The Bluetooth technology comprises hardware, software and interoperability requirements ideal for the mobile environment. The ability of the technology to create ad hoc networks on the fly reduces connection delays, alleviate expensive hardware and wires, while permitting total connectivity at minimum cost.

In some embodiments, a Service Discovery Protocol (SDP) allows Bluetooth devices to discover what services are available or to find a Bluetooth device that supports a specific service. Advantageously, embodiments of the present invention that implement a Bluetooth PAN are robust, less complex and capable of handling both data and voice transmission at the same time.

To make the system of the invention as robust as possible, in one embodiment, the operating band is divided into 1 MHz-spaced channels, each signaling data at 1 Mb/s. This is achieved by using GFSK (Gaussian Frequency Shift Keying) modulation scheme, for example. Mobile devices 120, 130 tune their radios to a different frequency, effectively hopping from radio channel to radio channel; this is known as FHSS (Frequency Hopping Spread Spectrum).

Thus, if a transmission is compromised by interference on one channel, the retransmission will be on a different channel. Each communication time slot can last approximately 625 μs (625 microseconds), for example, and generally each device has a hop rate of approximately 1600 hops/second.

Depending on implementation (see FIGS. 1A, 1B), the primary device(s) set the frequency hoping sequence and the non-primary device(s) synchronize to the primary in time and frequency by following the primary devices' frequency hoping sequence. Each device 110, 120, 130 is associated with a unique Bluetooth device address and a 28-bit Bluetooth clock. The baseband part of the Bluetooth System uses a special algorithm, which calculates the frequency hop sequence from the primary devices' clock and device address. In addition to controlling the frequency hop sequence, the primary device controls when non-primary devices are to transmit using Time Division Multiplexing (TDM), in one or more embodiments.

Referring to FIGS. 1A, 2, in an embodiment where call management device 110 is the primary device and mobile devices 120 and 130 are the non-primary devices, a piconet is formed, wherein all mobile devices follow the frequency hopping sequence of call management device 110. Mobile devices 120, 130 in the piconet have links to call management device 110 and no direct links to each other.

Referring to FIGS. 1B, 3, in another embodiment, a plurality of piconets are formed, where call management device is configured as the non-primary device and each mobile device 120, 130 is configured as the primary. This combination of piconets is referred to as a scatternet.

Due to the ad-hoc nature of a Bluetooth network, a plurality of mobile devices (120, 130, etc.) may come into and go out of range of service of call management device 110. As such, the wireless network topology and membership can be constantly changing. In one or more embodiments, for example, where mobile devices 120, 130 are configured as the non-primary device, each device upon entering the network range transmits ID packets, consisting of a unique inquiry access code (IAC).

The IAC is used to associate a mobile device 120, 130 with call management device 110. The IAC is stored as an entry in an association list as discussed earlier for distinguishing an authorized mobile device from another. In an embodiment of the invention where call management device 110 is configured as the primary device, call management device 110 scans for IACs. When an IAC is received, call management device 110 responds with a frequency hopping synchronization (FHS) packet and thereby a communication link is established between call management device 100 and mobile communication device 120, 130.

In certain embodiments, the link between a call management device 110 and mobile devices 120, 130 is established by one device initiating the connection by addressing the request directly to the other device. This is referred to as Paging. Depending on implementation, if call management device 110 is configures as the primary device, then the call management device 110 initiates the paging. Otherwise, mobile device 120, 130 does it.

The non-primary device listens for the paging requests. That is, the non-primary device scans for paging requests submitted by the primary device. At the conclusion of the paging process, the non-primary device synchronizes its communication frequency and channel hopping rate with the primary device.

In embodiments of the system, call management device 100 and mobile devices 120, 130 comprise a controlled system environment that can be presented largely in terms of hardware components and software code executed to perform processes that achieve the results contemplated by the system of the present invention. A more detailed description of such system environment is provided below with reference to FIGS. 4A, 4B.

Figure 4A:
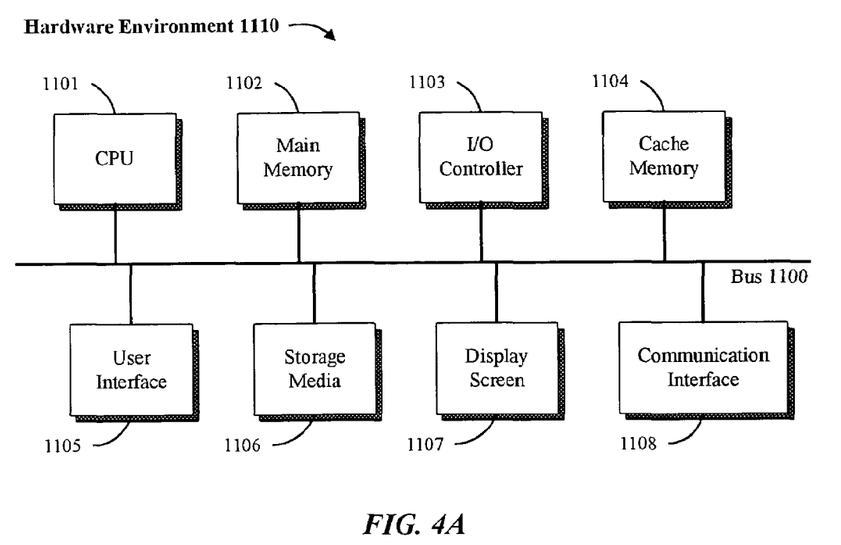
FIGS. 4A and 4B are block diagrams of hardware and software environments in which a system of the present invention may operate, in accordance with one or more embodiments.
Figure 4B:
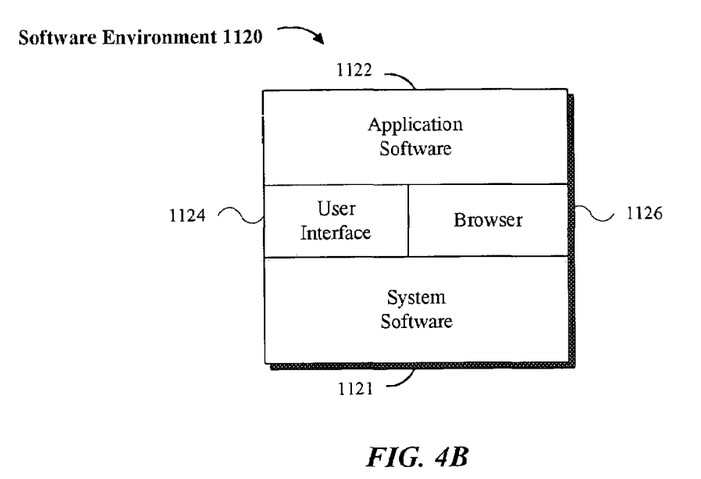

As shown, a computing system environment is composed of two environments, a hardware environment 1110 and a software environment 1120. The hardware environment 1110 comprises the machinery and equipment that provide an execution environment for the software. The software provides the execution instructions for the hardware. It should be noted that certain hardware and software components may be interchangeably implemented in either form, in accordance with different embodiments of the invention.

Software environment 1120 is divided into two major classes comprising system software 1121 and application software 1122. System software 1121 comprises control programs, such as the operating system (OS) and information management systems that instruct the hardware how to function and process information. Application software 1122 is a program that performs a specific task.

In certain embodiments of the invention, system and application software are implemented and executed on one or more hardware environments to establish one or more piconets in which mobile devices 120, 130 communicate with call management device 110 via Bluetooth communication interfaces.

Referring to FIG. 4A, an embodiment of the application software 1122 can be implemented as logic code in the form of computer readable code executed on a general purpose hardware environment 1110 that comprises a central processor unit (CPU) 1101, a main memory 1102, an input/output controller 1103, optional cache memory 1104, a user interface 1105 (e.g., keypad, pointing device, etc.), storage media 1106 (e.g., hard drive, memory, etc.), a display screen 1107, a communication interface 1108 (e.g., a wireless network card, a Blue tooth port, a wireless modem, etc.), and a system synchronizer (e.g., a clock, not shown in FIG. 4A).

Cache memory 1104 is utilized for storing frequently accessed information. A communication mechanism, such as a bi-directional data bus 1100, can be utilized to provide for means of communication between system components. Hardware Environment 1110 is capable of communicating with local or remote systems connected to a wireless communications network (e.g., a PAN or a WAN) through communication interface 1108.

In one or more embodiments, hardware environment 1110 may not include all the above components, or may include additional components for additional functionality or utility. For example, hardware environment 1110 can be a laptop computer or other portable computing device that can send messages and receive data through communication interface 1108. Hardware environment 10 may also be embodied in an embedded system such as a set-top box, a personal data assistant (PDA), a wireless communication unit (e.g., cellular phone), or other similar hardware platforms that have information processing and/or data storage and communication capabilities. For example, in one or more embodiments of the system, hardware environment 1110 may comprise a PMG unit or an equivalent thereof.

In embodiments of the system, communication interface 1108 can send and receive electrical, electromagnetic, or optical signals that carry digital data streams representing various types of information including program code. If communication is established via a communications network, hardware environment 1110 may transmit program code through the network connection. The program code can be executed by central processor unit 1101 or stored in storage media 1106 or other non-volatile storage for later execution.

Program code may be transmitted via a carrier wave or may be embodied in any other form of computer program product. A computer program product comprises a medium configured to store or transport computer readable code or a medium in which computer readable code may be embedded. Some examples of computer program products are memory cards, CD-ROM disks, ROM cards, floppy disks, magnetic tapes, computer hard drives, and network server In one or more embodiments of the invention, processor 1101 is a microprocessor manufactured by Motorola, Intel, or Sun Microsystems Corporations, for example. The named processors are for the purpose of example only. Any other suitable microprocessor, microcontroller, or microcomputer may be utilized.

Referring to FIG. 4B, software 1120 or one or more of its components is stored in storage media 1106 and is loaded into memory 1102 prior to execution. Software environment 1120 comprises system software 1121 and application software 1122. Depending on system implementation, certain aspects of software environment 1120 can be loaded on one or more hardware environments 1110.

System software 1121 comprises control software, such as an operating system that controls the low-level operations of hardware environment 1110. Low-level operations comprise the management of the system resources such as memory allocation, file swapping, and other core computing tasks. In one or more embodiments of the invention, the operating system can be Nucleus, Microsoft Windows, Microsoft Windows, Macintosh OS, or IBM OS/2. However, any other suitable operating system may be utilized.

Application software 1122 can comprise one or more computer programs that are executed on top of system software 1121 after being loaded from storage media 1106 into memory 1102. In a client-server architecture, application software 1122 may comprise client software and server software. Referring to FIG. 1A and 1B for example, in one embodiment of the invention, client software is executed on mobile devices 120, 130 and server software is executed on call management device 110.

Software environment 1120 may also comprise web browser software 1126 for accessing content on a remote server. Further, software environment 1120 may comprise user interface software 1124 (e.g., a Graphical User Interface (GUI)) for receiving user commands and data. The received commands and data are processed by the software applications that run on the hardware environment 1110. The hardware and software architectures and environments described above are for purposes of example only. Embodiments of the invention may be implemented in any type of system architecture or processing environment.

Embodiments of the invention are described by way of example as applicable to systems and corresponding methods that utilize Bluetooth communication technology. In this exemplary embodiment, logic code for performing these methods is implemented in the form of, for example, application software 1122. The logic code, in one embodiment, may be comprised of one or more modules that execute on one or more processors in a distributed or non-distributed communication model. For example, one or more embodiments of the present invention may comprise separate radio and baseband modules, or alternatively modules incorporating the radio, baseband, micro-controller and flash memory in a single-chip solution.

It should also be understood that the programs, modules, processes, methods, and the like, described herein are but exemplary implementations and are not related, or limited, to any particular computer, apparatus, or computer programming language. Rather, various types of general-purpose computing machines or customized devices may be used with logic code implemented in accordance with the teachings provided, herein. Further, the order in which the methods of the present invention are performed is purely illustrative in nature. These methods can be performed in any order or in parallel, unless indicated otherwise in the present disclosure.

The methods of the present invention may be performed in either hardware, software, or any combination thereof. In particular, some methods may be carried out by software, firmware, or macrocode operating on a computer or computers of any type. Furthermore, such software may be transmitted in the form of a computer signal embodied in a carrier wave, and through communication networks by way of Internet portals or websites, for example. Accordingly, the present invention is not limited to any particular platform, unless specifically stated otherwise in the present disclosure.

The present invention has been described above with reference to preferred embodiments. However, those skilled in the art will recognize that changes and modifications may be made in these preferred embodiments without departing from the scope of the present invention. Other system architectures, platforms, and implementations that can support various aspects of the invention may be utilized without departing from the essential characteristics as described herein. These and various other adaptations and combinations of features of the embodiments disclosed are within the scope of the invention. The invention is defined by the claims and their full scope of equivalents.

The invention claimed is:

1. A method for establishing a wireless communication interface between a call management device and at least one mobile communication device from among a plurality of mobile communication devices communicating with the call management device, the method comprising:

implementing a unique association between the call management device and each of the plurality of mobile communication devices;

configuring the call management device as a primary device in a personal area network (PAN); wherein each of the plurality of the mobile communication devices is configured as a non-primary device in the PAN;

processing voice signals transmitted by a first mobile communication device to the call management device, in response to the call management device recognizing the first mobile communication device transmitting a service request, wherein the call management device services the first mobile communication device in exclusion of the other mobile communication devices in the PAN, based on a pre-existing unique association implemented between the call management device and the first mobile communication device.

2. The method of claim 1, wherein the implementing process comprises creating a list of the associations between the call management device and each of the plurality of mobile communication devices.

3. The method of claim 2, wherein the list is stored in a memory of the call management device.

4. The method of claim 1, wherein the PAN is a piconet for connecting the call management device to each of the plurality of mobile communication devices using Bluetooth communication technology.

5. The method of claim 1, wherein the call management device is a hands-free car kit.

6. A vehicle-mount call management system connected to N wireless mobile communication devices in a personal area network (PAN), wherein the call management system is configured as a primary device and each of the N wireless mobile communication devices is configured as a non-primary device in the PAN, wherein the call management system implements a unique association with each of the N wireless mobile communication devices, wherein the call management system processes voice signals transmitted by a first wireless mobile communication device to the call management device, in response to the call management device recognizing the first wireless mobile communication device transmitting a service request, wherein the call management device services the first wireless mobile communication device in exclusion of the other mobile communication devices, based on a pre-existing unique association implemented between the call management device and the first mobile communication device.

7. The call management system of claim 6, wherein the call management system is connected to the N wireless mobile communication devices in a piconet using Bluetooth technology.

8. The call management system of claim 6, wherein the call management system comprises a hands-free car kit having a list of associations, each association respectively identifying a corresponding mobile communication device in the PAN.

* * * * *